Oct. 13, 1942.  J. OSWIN  2,298,899

INTERFITTING MACHINE AND LIKE PARTS

Filed Feb. 1, 1940

Patented Oct. 13, 1942

2,298,899

UNITED STATES PATENT OFFICE 2,298,899

INTERFITTING MACHINE AND LIKE PART

John Oswin, Coventry, England, assignor of one-half to John Ernest Neale, Coventry, England Application February 1, 1940, Serial No. 316,858
In Great Britain February 3, 1939

3 Claims. (Cl. 308—22)

This invention relates to the construction and assembly of inter-fitting machine and like parts, such as bushes, liners, sleeves, shafts, pins, spindles and the like male parts and to their female counterparts with which they are required to be a close fit.

Up to the present time it has been thought sufficient, for the purpose of giving a lead, to chamfer or radius the leading end of a male part and to countersink the receiving end of a female part. It is found, however, that, since the chamfer, radius or countersink extends around the full circumference of the part, there is no lateral support for either part at the commencement of the operation of driving or forcing the one part into or onto the other part. The result is that one part cants over to one side and the two parts become jammed together with injurious effects to both parts.

The object of this invention is to avoid this tendency for the parts to become jammed and to facilitate the engagement of part and counterpart and to prevent damage to either part when engaging the one with the other.

For this purpose according to the present invention the leading end of the male part or the receiving end of the female part is formed so that the one part has a progressive engagement with the other part around one or more portions of the circumference, the other portion or portions being left of full diameter and axial length.

The diameter of the male part is reduced, or the diameter of the female part is increased, at one or more places around the leading or the receiving end, as the case may be, the reduction or the increase being either gradual or more or less abrupt.

The leading or receiving end of either part can be either coned at one or more places with the angle of the cone at an angle to the axis of the part, or made eccentric to the axis of the part and with one portion flush with the remainder of the part.

The essence of the present invention consists in forming the leading end of a male part or the receiving end of a female part in such a manner as to have a progressive engagement with its counterpart and at the same time to provide a lateral support at one or more places when engaging the one part with the other. The rate of progression may be fast or slow and in some cases more or less abrupt.

Figures 1, 2, 3:
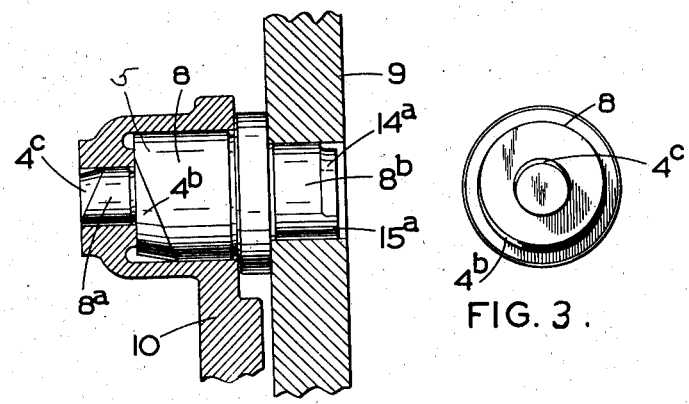
Figure 1 is a sectional view illustrating the application of the invention to the locating stud of a jig fixture.
Figures 2 and 3 are end views of the stud shown in Figure 1, Figure 2 being a view of the right hand end of the stud.

According to one embodiment of the invention the leading end of a male part or the receiving end of a female part, is coned at one place, the axis of the cone being in each case inclined to the axis of the part. Preferably, the coned portion subtends an angle exceeding 180° around the leading or receiving end. This is shown in Figures 1, 2 and 3 as applied to the two diameters 8 and 8ᵃ of a locating stud of a jig fixture 9 to receive and locate a machine component 10, the leading end of each diameter 8 and 8ᵃ being coned at 4ᵇ and 4ᶜ respectively. This formation of the leading end greatly facilitates the engagement of the spindle with its counter or female part, the initial engagement being progressive in the axial direction thereby preventing any tendency for the parts to jam and avoiding damage to either part. It will be observed that the parallel portion 5 of the leading end of each part 8 and 8ᵃ of said stud extends the full axial length of said part and provides a lateral support when introducing the latter corresponding bored part of the female element 10.

Instead of coning the leading or the receiving end of the male or female part it may be reduced uniformly or progressively around a portion of the circumference, the remaining part of the leading end being of the same diameter and flush and continuous with the remainder of the part. An example of this form of the invention is shown in Figures 1 and 2 as applied to the end of the locating stud 8 which is adapted for engagement with a hole in the jig fixture 9. In this case the said end 8ᵇ is reduced uniformly around a portion of its circumference at 14ᵃ to give a lead, the remaining part 15ᵃ being concentric and flush with the end of the stud to give lateral support when forcing the same into its hole.

Figure 4:
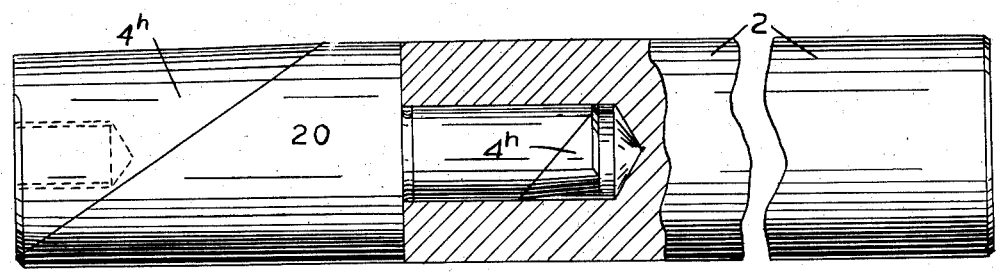
Figure 4 illustrates the application of the invention to the detachable leading end of a spindle or shaft.

Figure 4 shows the application of the invention to both ends of a detachable pilot 20 for a shaft or spindle 2. In this case each end of the pilot is coned at 4ʰ at an angle to its axis, in the one case to facilitate the attachment of the pilot to the end of the shaft and in the other case to facilitate engagement of the pilot with the female part which is to receive the shaft. The outer end of the pilot may be formed with a screw threaded hole 21 to receive a tool for removing the pilot after the shaft has been engaged with its counterpart.

In all the different forms of the invention herein described the free leading edge of the male or female part can be and preferably is radiussed or chamfered around the whole or a part of its circumference.

I claim:

1. Interfitting machine and like parts comprising a female element having a cylindrical inner wall surface and a complementary male element to be received by said female element with a close fit and having a cylindrical surface, the cylindrical surface of the one being opposed to the cylindrical surface of the other in their interfitted relationship, the cylindrical surface of one of said elements commencing rearwardly of its leading end, and the extreme leading end of said element being of non-circular cross-section and formed with an arcuate guiding surface constituting a forward continuation of the adjacent cylindrical surface of said element and at its extreme leading end subtending an angle of less than one hundred and eighty degrees and increasing in extent from its leading end toward said cylindrical surface of said element so as to subtend an increasing angle until it attains the maximum of three hundred and sixty degrees.

2. Interfitting machine and like parts comprising a female element having a large primary part and a small secondary part, said parts being formed with cylindrical bores concentric with a common axis and having large and small diameters respectively, in combination with a male element having a small secondary part and a large primary part, said male parts having a common axis and respectively being formed with a complete cylindrical surface and respectively snugly received in the corresponding small and large diameter bores of said female element, the extreme leading end of each said male part being non-circular in cross-section and formed with an arcuate guiding surface constituting a forward continuation of the adjacent complete cylindrical surface of said part and at its extreme leading end subtending an angle of less than 180 degrees and increasing in extent from its leading end toward said complete cylindrical surface, the said guiding surfaces of said parts extending on different sides respectively of the common axis of the cylindrical surface portions of said parts of said male element.

3. Interfitting machine and like parts comprising a bored female element having a large primary part and a small secondary part, said parts being formed with cylindrical bores concentric with a common axis and having large and small diameters respectively, in combination with a male element having a small secondary part and a large primary part, said male parts having a common axis and respectively being formed with a complete cylindrical face and respectively snugly received in the corresponding small and large diameter bores of said female element, one of the secondary parts of said elements and one of the primary parts of one of said elements each having its complete cylindrical surface commence rearwardly of its leading end, the extreme leading end of each said part being non-circular in cross-section and formed with an arcuate guiding surface constituting a forward continuation of the adjacent complete cylindrical surface of said part and at its extreme leading end subtending an angle of less than 180 degrees and increasing in extent from its leading end toward said complete cylindrical surface, the said guiding surfaces of said parts lying respectively on opposite sides of the common axis of said elements in their interfitted relation.

JOHN OSWIN.